(12) United States Patent
Satoh et al.

(10) Patent No.: US 10,297,390 B2
(45) Date of Patent: May 21, 2019

(54) ELECTRONIC COMPONENT

(71) Applicant: TDK CORPORATION, Tokyo (JP)

(72) Inventors: Fumiaki Satoh, Tokyo (JP); Takehisa Tamura, Tokyo (JP); Yuma Hattori, Tokyo (JP); Toru Onoue, Tokyo (JP); Daisuke Himeta, Tokyo (JP); Ken Morita, Tokyo (JP); Takuto Okamoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 6 days.

(21) Appl. No.: 15/703,632

(22) Filed: Sep. 13, 2017

(65) Prior Publication Data

US 2018/0082792 A1 Mar. 22, 2018

(30) Foreign Application Priority Data

Sep. 16, 2016 (JP) .................................. 2016-181465

(51) Int. Cl.
| | |
|---|---|
| *H01G 4/005* | (2006.01) |
| *H01G 4/008* | (2006.01) |
| *H01G 4/30* | (2006.01) |
| *H01G 4/228* | (2006.01) |
| *H01G 4/232* | (2006.01) |
| *H01G 4/35* | (2006.01) |
| *H01G 2/06* | (2006.01) |
| *H01G 4/12* | (2006.01) |

(52) U.S. Cl.
CPC .................. *H01G 4/35* (2013.01); *H01G 2/06* (2013.01); *H01G 4/005* (2013.01); *H01G 4/228* (2013.01); *H01G 4/232* (2013.01); *H01G 4/2325* (2013.01); *H01G 4/30* (2013.01); *H01G 4/12* (2013.01)

(58) Field of Classification Search
CPC .......... H01G 4/30; H01G 4/008; H01G 4/005; H01G 4/228; H01G 4/232
USPC ............ 361/306.1, 301.4, 321.2, 306.3, 303, 361/321.1, 321.3
See application file for complete search history.

(56) References Cited

U.S. PATENT DOCUMENTS

| | | | |
|---|---|---|---|
| 2011/0157767 A1* | 6/2011 | Hur ........................ | H01G 4/008 361/305 |
| 2012/0188684 A1* | 7/2012 | Akazawa ............... | H01G 4/012 361/321.2 |

FOREIGN PATENT DOCUMENTS

JP 2002-237429 A 8/2002

\* cited by examiner

*Primary Examiner* — Eric W Thomas
*Assistant Examiner* — Arun Ramaswamy
(74) *Attorney, Agent, or Firm* — Oliff PLC

(57) ABSTRACT

An element body includes first and second end surfaces opposing each other in a first direction, first and second side surfaces opposing each other in a second direction, and first and second principal surfaces opposing each other in a third direction. The length of the element body in the third direction is shorter than that of the element body in the first direction and is shorter than that of the element body in the second direction. A pair of first external electrodes is disposed at both ends of the element body in the first direction. Each of the first external electrodes includes a first conductor part disposed on one main surface and a second conductor part disposed on the end surface and coupled to the first conductor part. The porosity of the first conductor part is smaller than that of the second conductor part.

4 Claims, 9 Drawing Sheets

ELECTRONIC COMPONENT

BACKGROUND OF THE INVENTION

1. Field of the Invention

The present invention relates to an electronic component.

2. Description of Related Art

Japanese Unexamined Patent Publication No. 2002-237429 discloses an electronic component. The electronic component includes an element body of a rectangular parallelepiped shape and a pair of first external electrodes. The element body includes a pair of principal surfaces opposing each other, a pair of end surfaces opposing each other, and a pair of side surfaces opposing each other. The pair of first external electrodes is disposed at both ends of the element body. Each of the first external electrodes includes a first conductor part disposed on one of the main surfaces, and a second conductor part disposed on the end surface and coupled to the first conductor part.

SUMMARY OF THE INVENTION

An object of the present invention is to provide an electronic component in which occurrence of a crack in an element body is suppressed.

As a result of research and investigation, the inventors of the present invention have newly found the following facts.

When the electronic component is soldered to an electronic device (for example, circuit board or electronic component), external force acting on the electronic component from the electronic device may act on the element body via a solder fillet and an external electrode. The solder fillet is formed on the external electrode when the electronic component is soldered. For example, if the circuit board on which the electronic component is mounted by soldering is deflected, the external force due to the deflection of the circuit board acts on the element body via the solder fillet and the external electrode. When the external force acts on the element body, stress is generated in the element body as force in reaction to the external force.

When the electronic component is soldered to the electronic device, one of the pair of main surfaces is generally a mounting surface opposing the electronic device. The external force acting on the electronic component may act on the element body from an edge of a first conductor part positioned on the main surface that is the mounting surface. In which case, a crack may occur in the element body. A starting point of the crack is a portion of the element body in contact with the edge of the first conductor part. When the force acting on the element body from the edge of the first conductor part positioned on the main surface that is the mounting surface is small, the crack tends not to occur in the element body.

The inventors of the present invention have conducted intensive researches on a configuration in which the force acting on the element body from the edge of the first conductor part is reduced even when the external force acts on the electronic component.

As a result of the research, the inventors of the present invention have found a structure in which a porosity of the first conductor part is smaller than a porosity of a second conductor part. When the porosity of the first conductor part is different from the porosity of the second conductor part, the external electrode is structurally discontinuous at a position where the first conductor part and the second conductor part are coupled to each other. Therefore, when the external force acts on the external electrode, the crack tends to occur at the boundary between the first conductor part and the second conductor part. In a case where the crack occurs at the boundary between the first conductor part and the second conductor part, even when the external force acts on the electronic component via the solder fillet, the force acting on the element body from the edge of the first conductor part is small.

In the electronic component, to realize solder mounting, the outermost layer of the external electrode (conductor part) is generally a plating layer. In general, a conductor having a high porosity has a lower plating property than a conductor having a low porosity. Therefore, the plating layer formed on the conductor having a high porosity tends to peel off. Consequently, regarding the conductor having a high porosity, the bonding strength between the conductor and the electronic device by soldering may deteriorate.

When the electronic component is soldered to the electronic device, the one main surface is opposed to the electronic device. The contribution to the bonding strength between the electronic component and the electronic device by the solder of the first conductor part is larger than the contribution of the second conductor part. When the porosity of the first conductor part is smaller than the porosity of the second conductor part, a plating property at the first conductor part is larger and the bonding strength between the first external electrode and the electronic device by the solder is higher than when the porosity of the first conductor part is larger than the porosity that of the second conductor part.

As described above, when the porosity of the first conductor part is smaller than the porosity of the second conductor part, reduction in the bonding strength between the first external electrode and the electronic device is suppressed, and the occurrence of the cracks in the element body is suppressed.

An electronic component according to one aspect of the present invention includes an element body of a rectangular parallelepiped shape and a pair of first external electrodes. The element body includes first and second end surfaces opposing each other in a first direction, first and second side surfaces opposing each other in a second direction, and first and second principal surfaces opposing each other in a third direction. A length of the element body in the third direction is shorter than a length of the element body in the first direction and is shorter than a length of the element body in the second direction. The pair of first external electrodes is disposed at both ends of the element body in the first direction. Each of the first external electrodes has a first conductor part disposed on one main surface and a second conductor part disposed on the end surface and coupled to the first conductor part. A porosity of the first conductor part is smaller than a porosity of the second conductor part.

In the one aspect, the porosity of the first conductor part is smaller than that of the second conductor part. Therefore, reduction in the bonding strength between the electronic device on which the electronic component is mounted and the first external electrode is suppressed, and the occurrence of the cracks in the element body is suppressed.

The electronic component according to the one aspect may further include at least one second external electrode disposed on the element body. The second external electrode may be positioned between the pair of first external electrodes. The second external electrode may include a third conductor part disposed on the side surface. A porosity of the third conductor part may be smaller than the porosity of the second conductor part. In which case, reduction in the bonding strength between the electronic device and the second external electrode is suppressed.

The electronic component according to the one aspect may further include at least one second external electrode disposed on the element body. The second external electrode may be positioned between the pair of first external electrodes. The second external electrode may include a fourth conductor part disposed on one main surface. A maximum thickness of the fourth conductor part may be smaller than a maximum thickness of the first conductor part. In which case, when the electronic component is soldered to the electronic device, a posture of the electronic component is stabilized.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will be hereinafter described in detail with reference to the accompanying drawings. In the description, the same reference numerals are used for the same elements or elements having the same functions, and redundant descriptions thereabout are omitted.

First, a configuration of a multilayer feedthrough capacitor 1 according to the present embodiment is described with reference to FIGS. 1 to 3. FIG. 1 is a schematic perspective view illustrating the multilayer feedthrough capacitor according to the present embodiment. FIGS. 2 and 3 are diagrams for describing a cross-sectional configuration of the multilayer feedthrough capacitor. In the present embodiment, an electronic component is the multilayer feedthrough capacitor 1.

As illustrated in FIGS. 1 to 3, the multilayer feedthrough capacitor 1 includes an element body 2, a pair of external electrodes 5, a pair of external electrodes 9, a plurality of internal electrodes 11, and a plurality of internal electrodes 13. The pair of external electrodes 5 and the pair of external electrodes 9 are disposed on the element body 2. The plurality of internal electrodes 11 and the plurality of internal electrodes 13 are disposed in the element body 2. As illustrated in FIGS. 2 and 3, the multilayer feedthrough capacitor 1 is soldered to an electronic device (for example, circuit board or electronic component) 20. A solder fillet 22 is formed between the external electrodes 5 and 9 and a pad electrode (not shown) of the electronic device 20.

Figure 1:
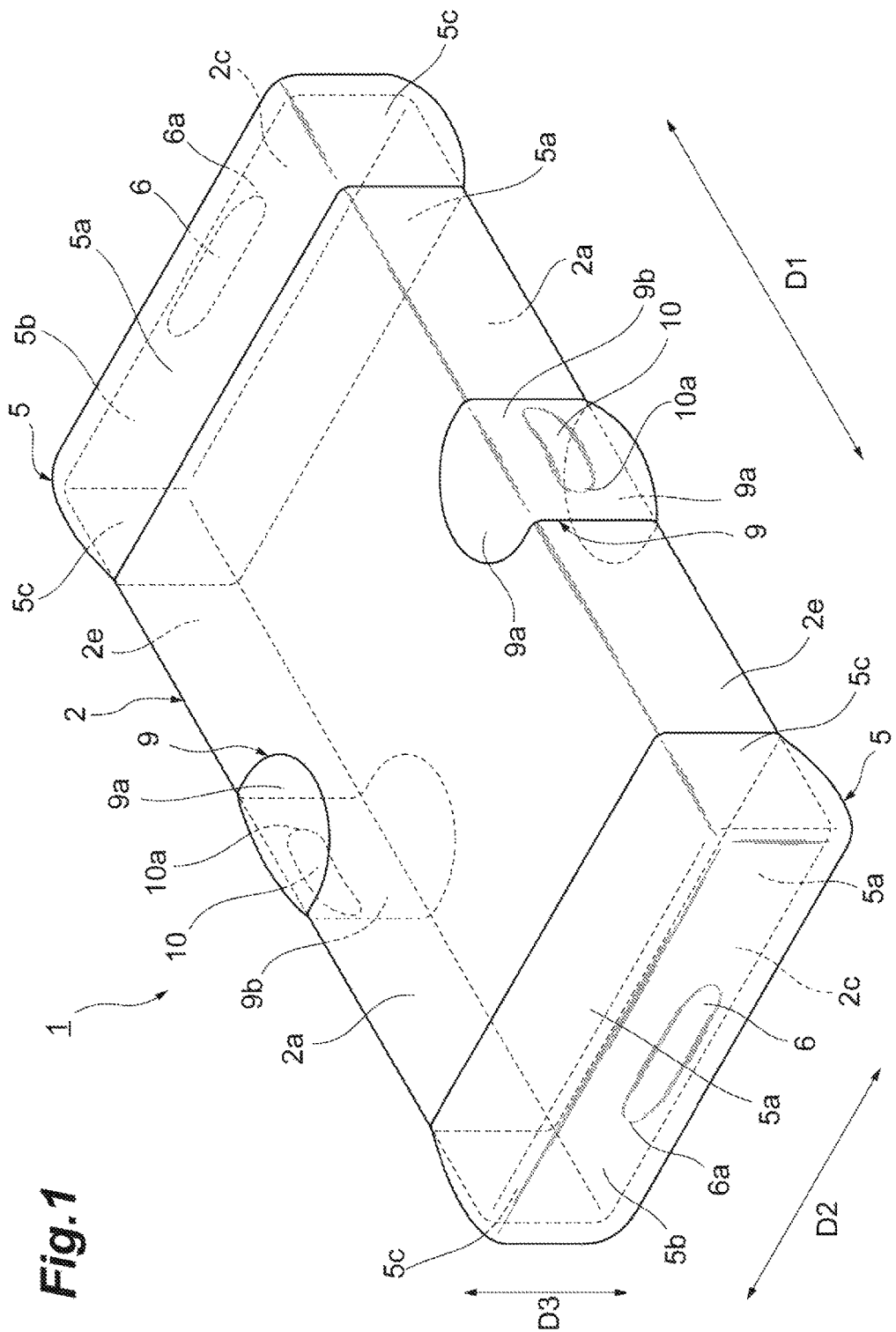
FIG. 1 is a schematic perspective view illustrating a multilayer feedthrough capacitor according to an embodiment.

The element body 2 includes a pair of principal surfaces 2a, a pair of end surfaces 2c, and a pair of side surfaces 2e. The pair of end surfaces 2c opposes each other in a first direction D1. The pair of side surfaces 2e opposes each other in a second direction D2. The pair of principal surfaces 2a opposes each other in a third direction D3. In the multilayer feedthrough capacitor 1, one principal surface 2a is a mounting surface opposing the electronic device 20. The first direction D1 is the longitudinal direction of the element body 2. The second direction D2 is the width direction of the element body 2. The third direction D3 is the height direction of the element body 2.

The element body 2 has a rectangular parallelepiped shape. The length of the element body 2 in the second direction D2 is shorter than the length of the element body 2 in the first direction D1. The length of the element body 2 in the third direction D3 is shorter than the length of the element body 2 in the second direction D2. The rectangular parallelepiped shape includes a shape of a rectangular parallelepiped in which corners and ridges are chamfered and a shape of a rectangular parallelepiped in which the corners and the ridges are rounded. In the present embodiment, the length of the element body 2 in the first direction D1 is 1.0 mm, the length of the element body 2 in the second direction D2 is 0.5 mm, and the length of the element body 2 in the third direction D3 is 0.2 mm.

The element body 2 is configured by laminating a plurality of dielectric layers in the third direction D3. In the element body 2, the lamination direction of the plurality of dielectric layers coincides with the third direction D3. Each dielectric layer includes a sintered body of a ceramic green sheet containing, for example, a dielectric material (dielectric ceramic such as $BaTiO_3$ based dielectric ceramic, $Ba(Ti, Zr)O_3$ based dielectric ceramic, or $(Ba, Ca)TiO_3$ based dielectric ceramic). In the actual element body 2, the dielectric layers are integrated to an extent such that the boundary between the dielectric layers cannot be visually recognized.

As illustrated in FIG. 1, the pair of external electrodes 5 is disposed at both ends of the element body 2 in the first direction D1. The pair of external electrodes 5 is separated from each other and opposes each other in the first direction D1. Each of the external electrodes 5 includes a pair of conductor parts 5a respectively disposed on the pair of principal surfaces 2a, a conductor part 5b disposed on the end surface 2c, a pair of conductor parts 5c respectively disposed on the pair of side surfaces 2e. The conductor parts 5a, 5b, and 5c are coupled to each other. The pair of external electrodes 5 functions, for example, as signal terminal electrodes.

As illustrated in FIG. 1, the pair of external electrodes 9 is disposed on the element body 2. The pair of external electrodes 9 is separated from the pair of external electrodes 5 and is positioned between the pair of external electrodes 5. The pair of external electrodes 9 is disposed on a central portion of the element body 2 in the first direction D1. The pair of external electrodes 9 is separated from each other and opposes each other in the second direction D2. Each external electrode 9 includes a pair of conductor parts 9a respectively disposed on the pair of principal surfaces 2a and a conductor part 9b disposed on the side surface 2e. The conductor parts 9a and 9b are coupled to each other. The pair of external electrodes 9 functions, for example, as ground terminal electrodes.

The internal electrodes 11 and 13 are disposed at different positions (layers) in the height direction of the element body 2. The internal electrodes 11 and 13 are disposed alternately in the element body 2 to oppose each other in the third direction D3 with an interval therebetween. The internal electrodes 11 function, for example, as signal internal electrodes. The internal electrodes 13 function, for example, as ground internal electrodes.

Each internal electrode 11 has a rectangular shape. The first direction D1 is the long side direction of the internal electrode 11. The second direction D2 is the short side direction of the internal electrode 11. Each of the internal electrodes 11 is exposed at the pair of end surfaces 2c and are not exposed at the pair of principal surfaces 2a and the pair of side surfaces 2e. Each internal electrode 11 is electrically and physically connected to the pair of external electrodes 5 at the pair of end surfaces 2c.

Each internal electrode 13 opposes the internal electrode 11 in the third direction D3 with a part (dielectric layer) of the element body 2 therebetween. Each internal electrode 13 includes a main electrode part and a pair of connection parts. The main electrode part has a rectangular shape. The first direction D1 is the long side direction of the main electrode part. The second direction D2 is the short side direction of the main electrode part. The connection part extends from the long side of the main electrode part and is exposed at the side surface 2e. The main electrode part and the connection parts are integrally formed. Each of the internal electrodes 13 is exposed at the pair of side surfaces 2e and is not exposed at the pair of principal surfaces 2a and the pair of end surfaces 2c. Each internal electrode 13 is electrically and physically connected to the pair of external electrodes 9 on the pair of side surfaces 2e.

The internal electrodes 11 and 13 are made of a conductive material (for example, Ni or Cu) that is normally used as an internal electrode of a multilayer electronic component. The internal electrodes 11 and 13 include a sintered body of conductive paste including the conductive material.

Figure 4:
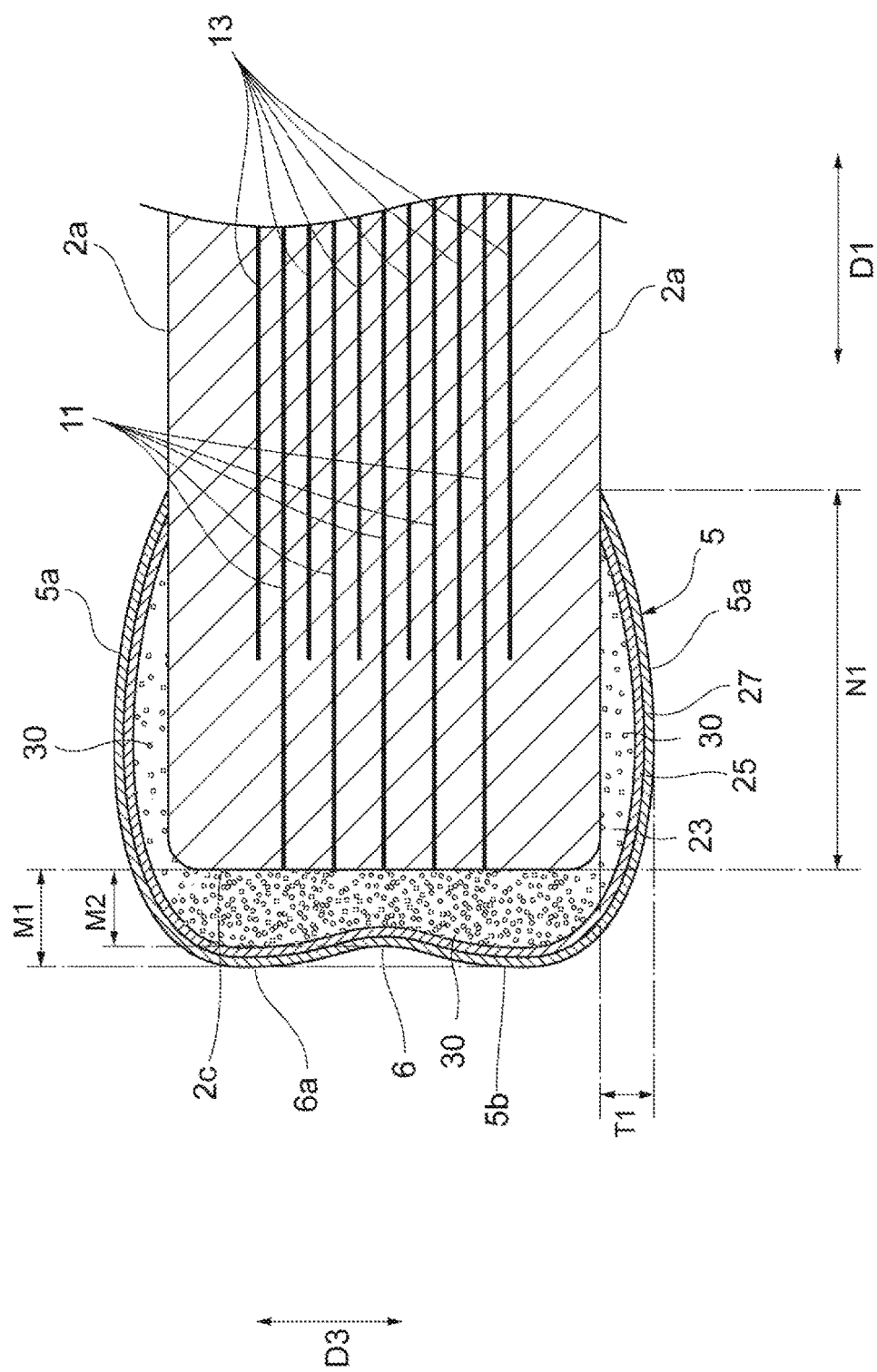
FIG. 4 is a diagram for describing a cross-sectional configuration of the multilayer feedthrough capacitor.
Figure 5:
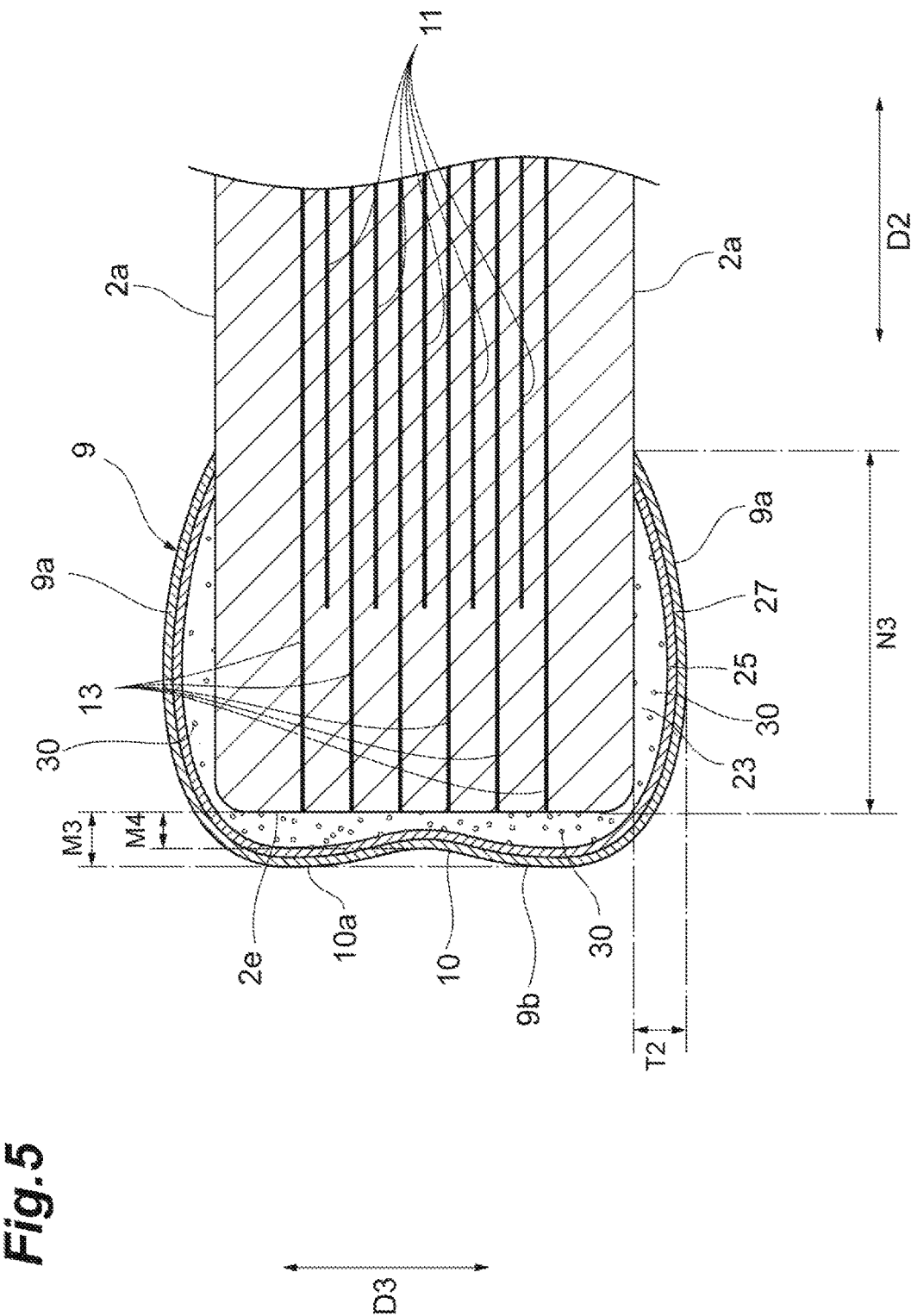
FIG. 5 is a diagram for describing a cross-sectional configuration of the multilayer feedthrough capacitor.
Figure 6:
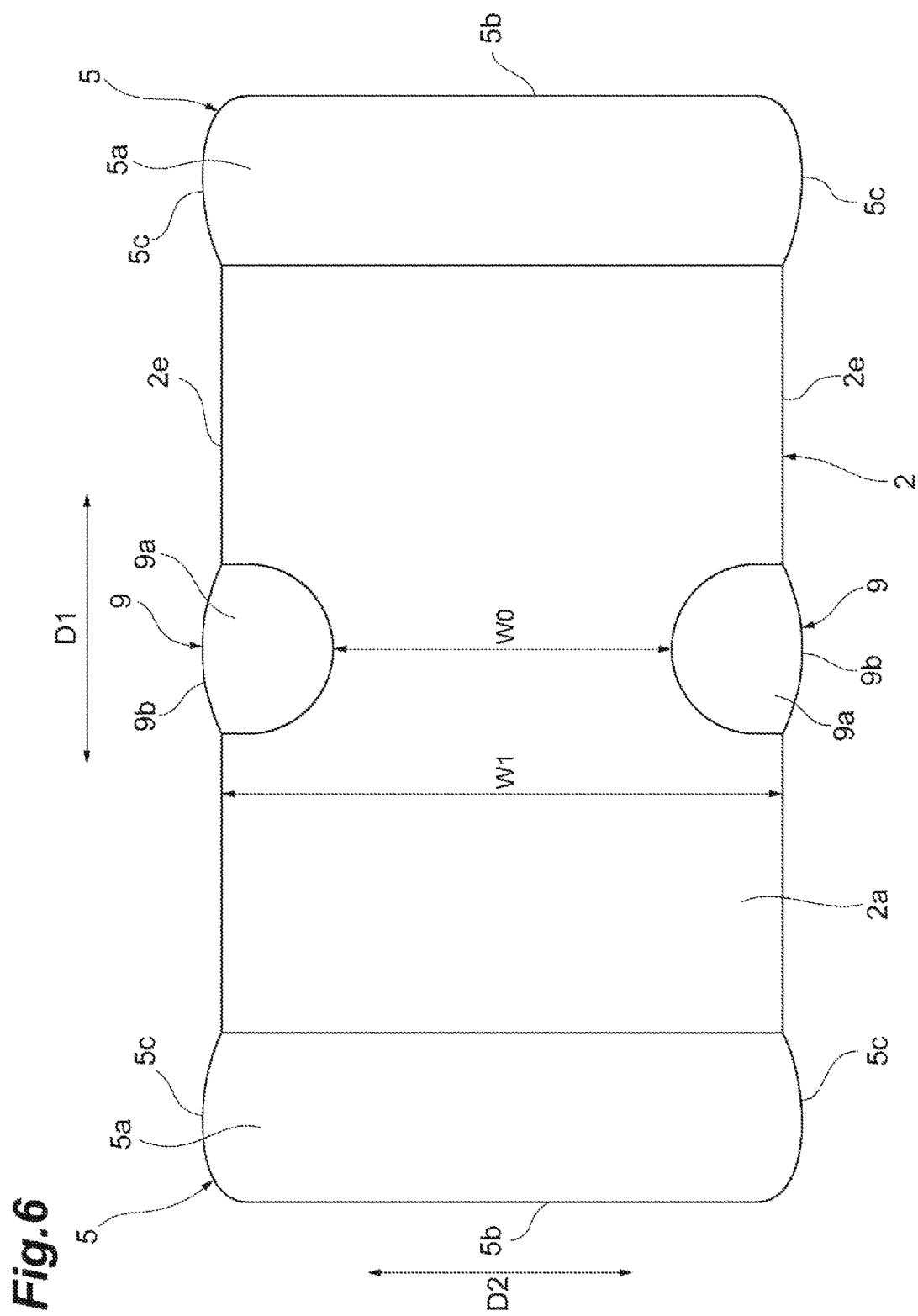
FIG. 6 is a plan view illustrating the multilayer feedthrough capacitor.
Figure 7:
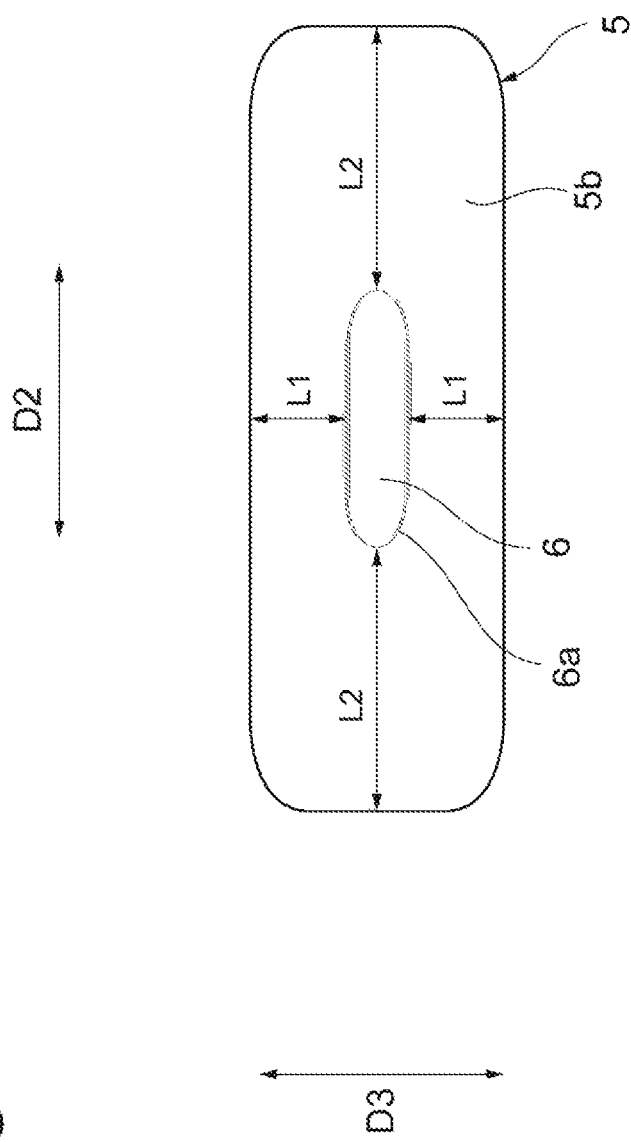
FIG. 7 is a side view illustrating the multilayer feedthrough capacitor.
Figure 8:
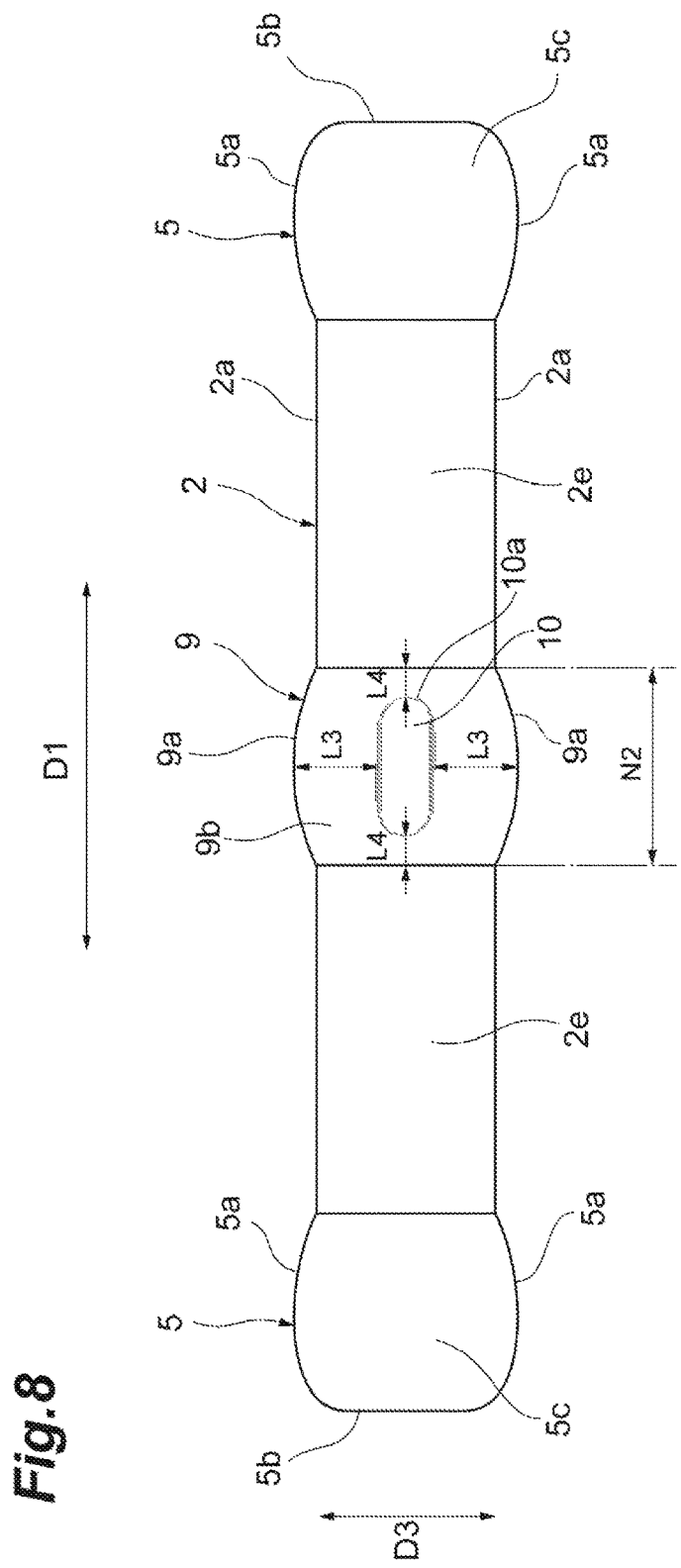
FIG. 8 is a side view illustrating the multilayer feedthrough capacitor.

Next, the configurations of the external electrodes 5 and 9 are described with reference to FIGS. 4 to 8. FIGS. 4 and 5 are diagrams for describing a cross-sectional configuration of the multilayer feedthrough capacitor. FIG. 6 is a plan view illustrating the multilayer feedthrough capacitor. FIGS. 7 and 8 are side views illustrating the multilayer feedthrough capacitor. FIG. 4 is a cross-sectional view of the multilayer feedthrough capacitor 1 taken along a plane that is parallel to the pair of side surfaces 2e and positioned at an equidistance from the pair of side surfaces 2e, for example. FIG. 5 is a cross-sectional view of the multilayer feedthrough capacitor 1 taken along a plane that is parallel to the pair of end surfaces 2c and positioned at an equidistance from the pair of end surfaces 2c, for example.

As illustrated in FIGS. 4 and 5, each of the external electrodes 5 and 9 includes an electrode layer 23, a first plating layer 25, and a second plating layer 27. The first plating layer 25 is formed on the electrode layer 23 by a plating method (for example, an electroplating method). The second plating layer 27 is formed on the first plating layer 25 by a plating method (for example, an electroplating method). Each of the conductor parts 5a, 5b, 5c, 9a, and 9b includes the electrode layer 23, the first plating layer 25, and the second plating layer 27. The electrode layer 23 is an underlayer for forming a plating layer.

The electrode layer 23 is formed by sintering the conductive paste applied on the surface of the element body 2. The electrode layer 23 is formed by sintering a metal component (metal powder) included in the conductive paste. The electrode layer 23 is a sintered metal layer. In the present embodiment, the electrode layer 23 is a sintered metal layer made of Cu. The electrode layer 23 may be a sintered metal layer made of Ni. The conductive paste contains powders made of Cu or Ni, a glass component, an organic binder, and an organic solvent.

In the present embodiment, the first plating layer 25 is a Ni plating layer formed by a Ni plating method. The first plating layer 25 may be a Sn plating layer, a Cu plating layer, or an Au plating layer. The second plating layer 27 is a Sn plating layer formed by a Sn plating method. The second plating layer 27 may be a Cu plating layer or an Au plating layer.

Each conductor part 5b covers an entire region of the corresponding end surface 2c. The entire region of the end surface 2c means an entire region surrounded by edges of the pair of principal surfaces 2a and edges of the pair of side surfaces 2e. As illustrated in FIG. 4, each conductor part 5a covers a part of the corresponding principal surface 2a. The conductor part 5a covers an entire region from the end surface 2c to a first length N1 in the first direction D1 on the principal surface 2a. Although not illustrated in FIG. 4, each conductor part 5c covers a part of the corresponding side surface 2e. The conductor part 5c covers an entire region from the end surface 2c to the first length N1 in the first direction D1 on the side surface 2e. In the present embodiment, the width of each of the conductor parts 5a and 5c in the first direction D1 is the first length N1. The first length N1 is, for example, 0.15 mm.

As illustrated in FIG. 8, each conductor part 9b covers a part of the corresponding side surface 2e. A region in the side surface 2e covered with the conductor part 9b is positioned at a center of the side surface 2e in the first direction D1. The width of the region covered with the conductor part 9b in the first direction D1 is a second length N2, and the width of the region covered with the conductor part 9b in the third direction D3 is the length of the element body 2 in the third direction D3. The conductor part 9b covers an entire region in which a width in the first direction D1 is the second length N2 and sandwiched between respective ends of the pair of principal surfaces 2a. In the present embodiment, the width of the conductor part 9b in the first direction D1 is the second length N2. The second length N2 is, for example, 0.30 mm. An end of the conductor part 9a having the width of the second length N2 in the first direction D1 is coupled to the conductor part 9b. As illustrated in FIG. 5, each of the conductor parts 9a covers a part of the corresponding principal surface 2a. The conductor part 9a extends from the side surface 2e to a position of a third length N3 in the second direction D2 on the principal surface 2a. In the present embodiment, the maximum width of the conductor part 9a in the second direction D2 is the third length N3. The third length N3 is, for example, 0.10 mm.

As illustrated in FIG. 6, the conductor parts 9a of the pair of external electrodes 9 oppose each other on the principal surfaces 2a in the second direction D2. In the multilayer feedthrough capacitor 1, relationship between the shortest distance W0 between the pair of conductor parts 9a on the principal surface 2a and the length W1 of the element body 2 in the second direction D2 satisfies 1.18≤W1/W0≤5.0. In the present embodiment, the shortest distance W0 is 0.30 mm, the length W1 is 0.48 mm, and W1/W0 is 1.6.

As illustrated in FIGS. 4 and 5, the maximum thickness T2 of the conductor part 9a is smaller than the maximum thickness T1 of the conductor part 5a. The maximum thickness T1 is the maximum value of the distance from the principal surface 2a to an outer surface of the conductor part 5a in the third direction D3. The maximum thickness T2 is the maximum value of the distance from the principal surface 2a to an outer surface of the conductor part 9a in the third direction D3. In the present embodiment, the maximum thickness T1 is 0.015 mm. The maximum thickness T2 is 0.01 mm.

As illustrated in FIGS. 4 and 7, a depression 6 is formed in the conductor part 5b of each of the pair of external electrodes 5. The depression 6 is positioned at a center of the conductor part 5b when viewed from the first direction D1. As illustrated in FIG. 4, the thickness of the conductor part 5b in the first direction D1 varies from an end of the conductor part 5b toward the center of the conductor part 5b in such a manner as to gradually increase and then gradually decrease. The end of the conductor part 5b is a portion where the conductor part 5b is coupled to the conductor parts 5a and 5c. The thickness of the conductor part 5b in the first direction D1 becomes the smallest in the vicinity of the center of the conductor part 5b. In the present embodiment, a portion recessed from a position where the thickness of the conductor part 5b becomes the largest toward the center of the conductor part 5b is the depression 6. The position where the thickness of the conductor part 5b becomes the largest is an outer edge 6a of the depression 6. The outer edge 6a is a position where a virtual plane parallel to the end surface 2c is in contact with the surface of the conductor part 5b.

Figure 9:
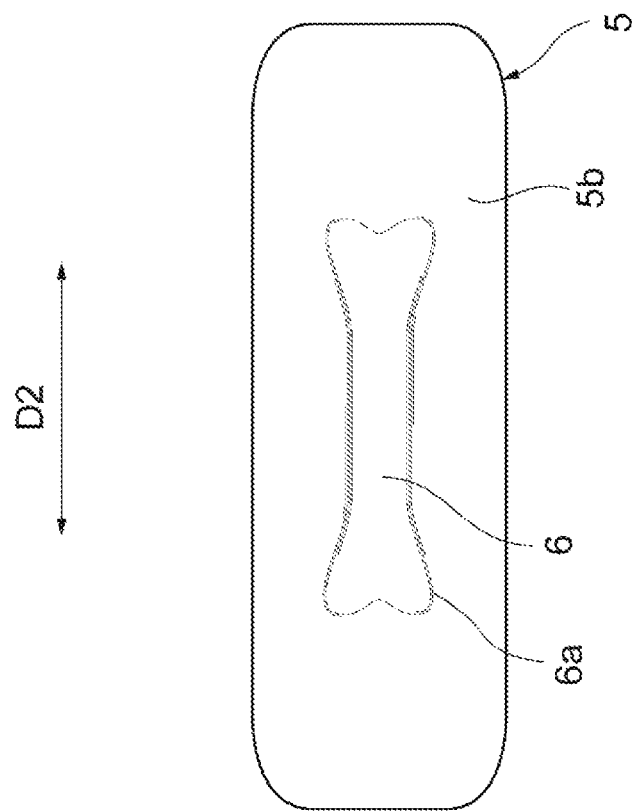
FIG. 9 is a side view illustrating a multilayer feedthrough capacitor according to a modification of the present embodiment.

In the present embodiment, as illustrated in FIG. 7, the outer edge 6a of the depression 6 has an elliptical shape when viewed from the first direction D1. The elliptical shape also includes an oval shape. The outer edge 6a of the depression 6 may have a shape illustrated in FIG. 9. In the shape illustrated in FIG. 9, the ends of the elliptical outer edge 6a extend toward the four corners (four corners of end surface 2c) of the conductor part 5b. When viewed from the first direction D1, the area of the depression 6 illustrated in FIG. 9 is larger than the area of the depression 6 illustrated in FIG. 7. FIG. 9 is a side view illustrating a multilayer feedthrough capacitor according to a modification of the present embodiment.

In the present embodiment, the shortest distance L1 from an end of the external electrode 5 to the outer edge 6a of the depression 6 in the third direction D3 when viewed from the first direction D1 is 0.09 mm. When viewed from the first direction D1, the shortest distance L2 from the end of the external electrode 5 to the outer edge 6a of the depression 6 in the second direction D2 is 0.17 mm. The maximum thickness M1 of the conductor part 5b is 0.03 mm. The minimum thickness M2 of the conductor part 5b is 0.02 mm. The depth of the depression 6 is 0.01 mm. The maximum thickness M1 is the maximum value of the distance from the end surface 2c to an outer surface of the conductor part 5b disposed on the end surface 2c in the first direction D1.

In the pair of external electrodes 9, as illustrated in FIGS. 5 and 8, a depression 10 is formed in the conductor part 9b. The depression 10 is positioned at a center of the conductor part 9b when viewed from the second direction D2. As illustrated in FIG. 5, the thickness of the conductor part 9b in the second direction D2 varies from an end of the conductor part 9b toward the center of the conductor part 9b in such a manner as to gradually increase and then gradually decrease. The end of the conductor part 9b is a portion where the conductor part 9b is coupled to the conductor part 9a. The thickness of the conductor part 9b in the second direction D2 becomes the smallest in the vicinity of the center of the conductor part 9b. In the present embodiment, a portion recessed from a position where the thickness of the conductor part 9b becomes the largest toward the center of the conductor part 9b is the depression 10. The position where the thickness of the conductor part 9b becomes the largest is an outer edge 10a of the depression 10. The outer edge 10a is a position where a virtual plane parallel to the side surface 2e is in contact with the surface of the conductor part 9b. In the present embodiment, as illustrated in FIG. 8, the outer edge 10a of the depression 10 has an elliptical shape when viewed from the second direction D2. The elliptical shape also includes an oval shape.

In the present embodiment, the shortest distance L3 from an end of the external electrode 9 to the outer edge 10a of the depression 10 in the third direction D3 when viewed from the second direction D2 is 0.09 mm. When viewed from the second direction D2, the shortest distance L4 from the end of the external electrode 9 to the outer edge 10a of the depression 10 in the first direction D1 is 0.08 mm. The maximum thickness M3 of the conductor part 9b is 0.02 mm. The minimum thickness M4 of the conductor part 9b is 0.015 mm. The depth of the depression 10 is 0.005 mm. The maximum thickness M3 is the maximum value of the distance from the side surface 2e to an outer surface of the conductor part 9b disposed on the side surface 2e in the second direction D2.

The electrode layer 23 of each external electrode 5 includes a plurality of voids 30 as illustrated in FIG. 4. The voids 30 are made of a substance (for example, glass and air) other than a conductive member. The voids 30 are regions where no conductive member exists. The voids 30 include not only regions made of air but also regions made of glass. In FIG. 4, the void 30 is schematically indicated by a circle. The shape of the void 30 is not limited to a circle (ball).

In each external electrode 5, a porosity of the conductor part 5a is smaller than a porosity of the conductor part 5b. In the present embodiment, a porosity of the conductor part 5c is also smaller the porosity of the conductor part 5b. The porosity of the conductor part 5a is equal to the porosity of the conductor part 5c. The porosity of the conductor part 5a may be different from the porosity of the conductor part 5c. In the present embodiment, the porosity of each of the conductor parts 5a and 5c is 1.5%, and the porosity of the conductor part 5b is 2.5%. In the present embodiment, the first plating layer 25 and the second plating layer 27 have dense structures, and do not substantially include substances other than the conductive member, that is, the voids 30. The porosity of the conductor part 5a is a porosity of the electrode layer 23 included in the conductor part 5a. The porosity of the conductor part 5b is a porosity of the electrode layer 23 included in the conductor part 5b. The porosity of the conductor part 5c is a porosity of the electrode layer 23 included in the conductor part 5c.

The porosity of each of the conductor parts 5a, 5b, and 5c can be obtained, for example, as follows.

At least two cross-sectional views including the electrode layers 23 of the conductor parts 5a, 5b, and 5c are obtained. One cross-sectional view is, for example, a cross-sectional view when the external electrode 5 is cut along a plane parallel to the pair of side surfaces 2e and positioned equidistant from the pair of side surfaces 2e. Another cross-sectional view is, for example, a sectional diagram when the external electrode 5 is cut along a plane parallel to the pair of principal surfaces 2a and positioned equidistant from the pair of principal surfaces 2a. The area of the electrode layer 23 of each of the conductor parts 5a, 5b, and 5c in the obtained cross-sectional view and the area of the region where the conductive member does not exist in the electrode layer 23 of each of the conductor parts 5a, 5b, and 5c are calculated.

A value of a quotient obtained by dividing the area of the region where the conductive member does not exist in the electrode layer 23 of the conductor part 5a by the area of the electrode layer 23 of the conductor part 5a, expressed as a percentage, indicates the porosity of the conductor part 5a. A value of a quotient obtained by dividing the area of the region where the conductive member does not exist in the electrode layer 23 of the conductor part 5b by the area of the electrode layer 23 of the conductor part 5b, expressed as a percentage, indicates the porosity of the conductor part 5b. A value of a quotient obtained by dividing the area of the region where the conductive member does not exist in the electrode layer 23 of the conductor part 5c by the area of the electrode layer 23 of the conductor part 5c, expressed as a percentage, indicates the porosity of the conductor part 5c.

As illustrated in FIG. 5, the electrode layer 23 of each external electrode 9 also includes a plurality of voids 30 made of a substance other than the conductive member. In each external electrode 9, a porosity of the conductor part 9a is smaller than a porosity of the conductor part 9b. The porosity of the conductor part 9a is smaller than the porosity of the conductor part 5a. The porosity of the conductor part 9b is smaller than the porosity of the conductor part 5b. In the present embodiment, the porosity of the conductor part 9a is 0.5%, and the porosity of the conductor part 9b is 1.0%. The porosity of the conductor part 9a is a porosity of the electrode layer 23 included in the conductor part 9a. The porosity of the conductor part 9b is a porosity of the electrode layer 23 included in the conductor part 9b.

The porosity of each of the conductor parts 9a and 9b can be obtained, for example, as follows.

A cross-sectional view including the electrode layers 23 of the conductor parts 9a and 9b is obtained. The cross-sectional view is, for example, a cross-sectional view when the external electrode 9 is cut along a plane parallel to the pair of end surfaces 2c and positioned equidistant from the pair of end surfaces 2c. The area of the electrode layer 23 of each of the conductor parts 9a and 9b in the obtained cross-sectional view and the area of the region where the conductive member does not exist in the electrode layer 23 of each of the conductor parts 9a and 9b are calculated.

A value of a quotient obtained by dividing the area of the region where the conductive member does not exist in the electrode layer 23 of the conductor part 9a by the area of the electrode layer 23 of the conductor part 9a, expressed as a percentage, indicates the porosity of the conductor part 9a. A value of a quotient obtained by dividing the area of the region where the conductive member does not exist in the electrode layer 23 of the conductor part 9b by the area of the electrode layer 23 of the conductor part 9b, expressed as a percentage, indicates the porosity of the conductor part 9b.

As described above, in each external electrode 5 of the multilayer feedthrough capacitor 1, the porosity of the conductor part 5a (electrode layer 23) is different from the porosity of the conductor part 5b (electrode layer 23). Each external electrode 5 is structurally discontinuous at a position where the conductor parts 5a and 5b are coupled to each other. Therefore, when the external force acts on the external electrode 5 via the solder fillet 22, the crack tends to occur at the boundary between the conductor parts 5a and 5b. When the crack occurs at the boundary between the conductor parts 5a and 5b, the force acting on the element body 2 from the edge of the conductor part 5a is small. Stress is generated in the element body 2 due to the force acting on the element body 2 from the edge of the conductor part 5a. Therefore, in the multilayer feedthrough capacitor 1, the stress generated in the element body 2 is small. As a result, in the multilayer feedthrough capacitor 1, the occurrence of the cracks in the element body 2 is suppressed.

Even when the crack occurs at the boundary between the conductor parts 5a and 5b, physical connection between the conductor part 5b and the solder fillet 22 is maintained. Therefore, electrical connection between the pad electrode of the electronic device 20 and the internal electrode 11 is maintained. The function of the multilayer feedthrough capacitor 1 is not damaged.

When the multilayer feedthrough capacitor 1 is soldered to the electronic device 20, one principal surface 2a opposes the electronic device 20. Regarding the contribution to the bonding strength between the electronic device 20 and the multilayer feedthrough capacitor 1 (external electrode 5) by the solder, the conductor part 5a disposed on the principal surface 2a has larger contribution than the conductor part 5b disposed on the end surface 2c. When the porosity of the conductor part 5a (electrode layer 23) is smaller than the porosity of the conductor part 5b (electrode layer 23), the plating property at the conductor part 5a is larger and the bonding strength between the external electrode 5 and the electronic device 20 is higher than when the porosity of the conductor part 5a is larger than the porosity of the conductor part 5b.

In the multilayer feedthrough capacitor 1, the porosity of the conductor part 5a (electrode layer 23) is smaller than the porosity of the conductor part 5b (electrode layer 23). Therefore, reduction in the bonding strength between the external electrode 5 and the electronic device 20 is suppressed, and the occurrence of the cracks in the element body 2 is suppressed.

In the multilayer feedthrough capacitor 1, the porosity of the conductor part 9a (electrode layer 23) is smaller than the porosity of the conductor part 9b (electrode layer 23). When the porosity of the conductor part 9a (electrode layer 23) is smaller than the porosity of the conductor part 9b (electrode layer 23), the plating property at the conductor part 9a is larger and the bonding strength between the external electrode 9 and the electronic device 20 is higher than when the porosity of the conductor part 9a is larger than the porosity of the conductor part 9b. Therefore, in the multilayer feedthrough capacitor 1, reduction in the bonding strength between the external electrode 9 and the electronic device 20 is suppressed, and the occurrence of the cracks in the element body 2 is suppressed.

The surface area of the external electrode 9 is smaller than the surface area of the external electrode 5. When the multilayer feedthrough capacitor 1 is mounted on the electronic device 20, the amount of the solder applied to the external electrode 9 is smaller than the amount of the solder applied to the external electrode 5. Therefore, if the plating property at the conductor part 5b is equal to the plating property at the conductor part 9b, the bonding strength between the conductor part 9b and the electronic device 20 may be lowered below the bonding strength between the conductor part 5a and the electronic device 20

Since the porosity of the conductor part 9b (electrode layer 23) is smaller than the porosity of the conductor part 5b (electrode layer 23), the plating property at the conductor part 9b is larger than the plating property at the conductor part 5b. Therefore, the bonding strength between the conductor part 9b and the electronic device 20 is secured. Since the porosity of the conductor part 9a (electrode layer 23) is smaller than the porosity of the conductor part 5a (electrode layer 23), the plating property at the conductor part 9a is larger than the plating property at the conductor part 5a. Therefore, the bonding strength between the conductor part 9a and the electronic device 20 is secured.

The maximum thickness T2 of the conductor part 9a of the external electrode 9 is smaller than the maximum thickness T1 of the conductor part 5a of the external electrode 5. Therefore, when the multilayer feedthrough capacitor 1 is soldered to the electronic device 20, the posture of the multilayer feedthrough capacitor 1 is stabilized.

Figure 2:
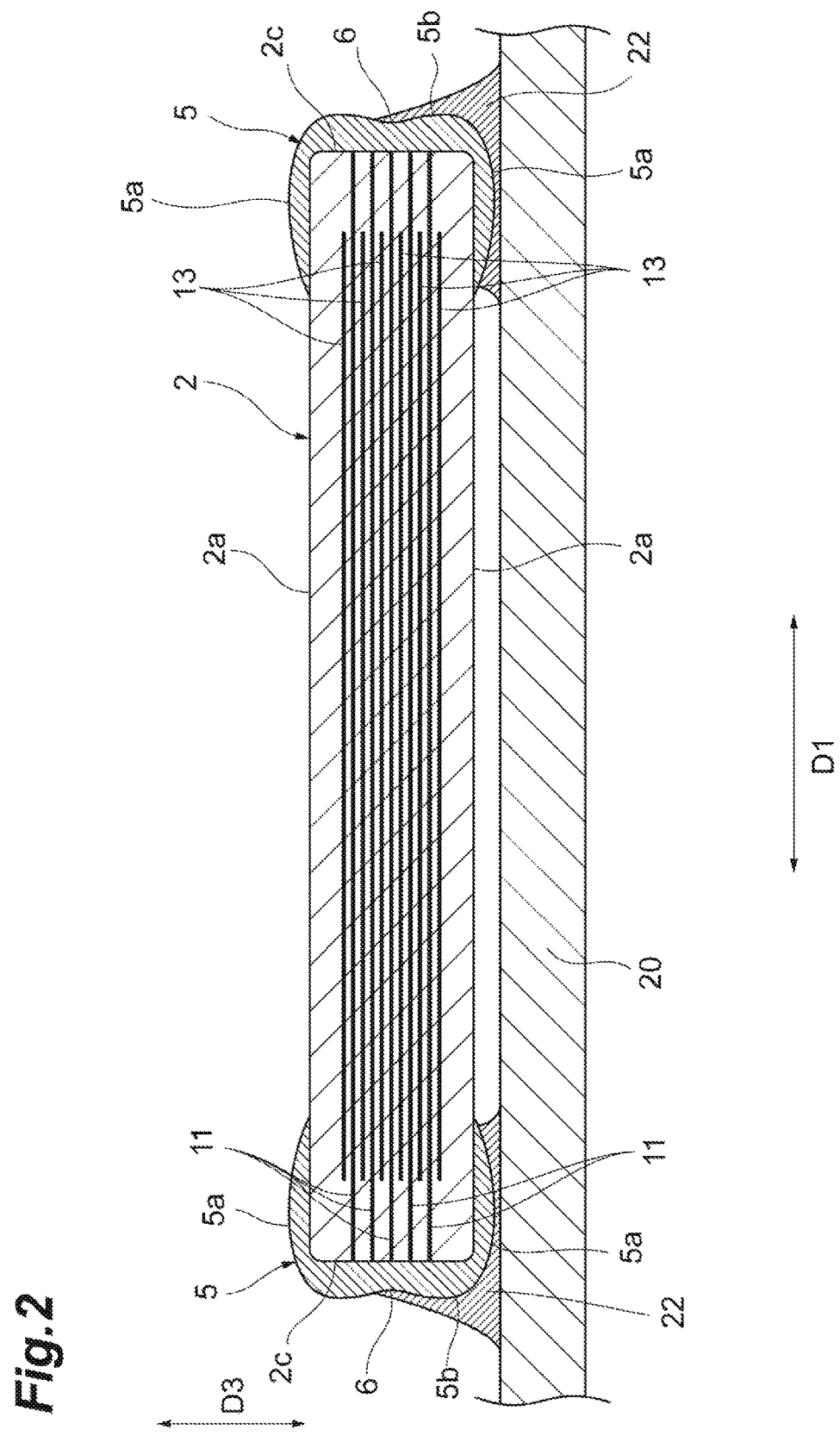
FIG. 2 is a diagram for describing a cross-sectional configuration of the multilayer feedthrough capacitor.
Figure 3:
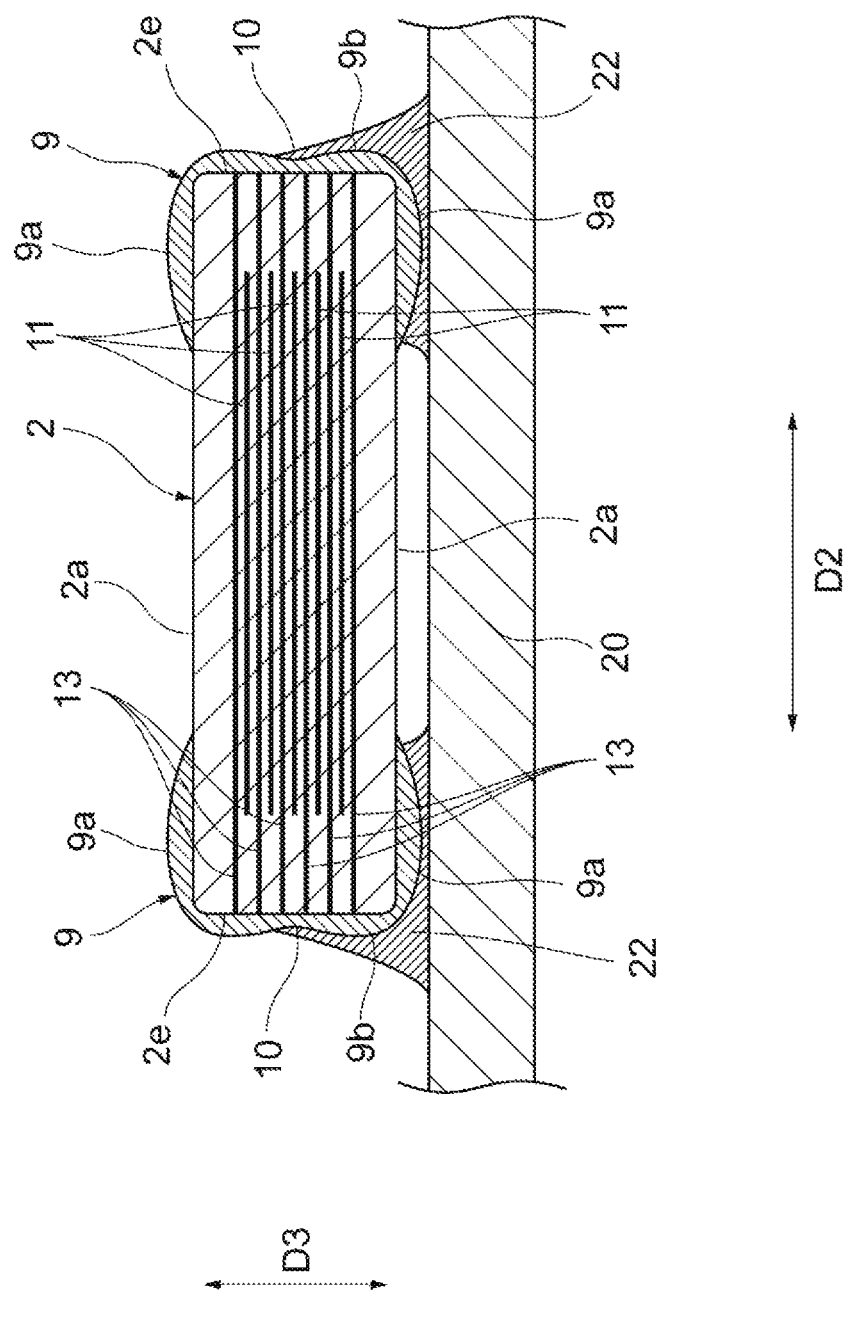
FIG. 3 is a diagram for describing a cross-sectional configuration of the multilayer feedthrough capacitor.

As illustrated in FIGS. 2 and 3, the laminated feedthrough capacitor 1 is physically connected to the electronic device 20 by the solder fillet 22 formed between each of the external electrodes 5 and 9 and the pad electrode of the electronic device 20. For example, when the electronic device 20 has a plate-like shape as the circuit board, the electronic device 20 may be deflected. In the laminated feedthrough capacitor 1, not only the pair of external electrodes 5 but also the pair of external electrodes 9 are also bonded to the electronic device 20 by soldering. If the electronic device 20 on which the laminated feedthrough capacitor 1 is mounted is deflected, stress due to the deflection of the electronic device 20 may concentrate in a region where the external electrode 9 is disposed on the element body 2 and in the vicinity of the region.

The greater the binding force that the external electrode 9 receives from the electronic device 20 via the solder fillet 22 is, the greater the stress caused by the deflection of the electronic device 20 is. Therefore, if the bonding strength between the external electrode 9 and the electronic device 20 by the solder fillet 22 is excessively large, cracks may occur in the element body 2 due to the stress generated in the element body 2 caused by the deflection of the electronic device 20.

In the multilayer feedthrough capacitor 1, the depression 10 is formed in the conductor part 9b. Therefore, when the multilayer feedthrough capacitor 1 is soldered to the electronic device 20, the solder wetted on the conductor part 9b tends not to be wetted beyond the depression 10. In comparison with a multilayer feedthrough capacitor in which the depression 10 is not formed in the conductor part 9b, the height of the solder wetted on the conductor part 9b is low in the multilayer feedthrough capacitor 1. In the multilayer feedthrough capacitor 1, the solder fillet 22 formed on the conductor part 9b is small, and the binding force that the conductor part 9b receives from the electronic device 20 via the solder fillet 22 is reduced. Consequently, the stress generated in the element body 2 due to deflection of the electronic device 20 is reduced. As a result, the occurrence of the cracks in the element body 2 is suppressed.

The depression 10 is positioned at the center of the conductor part 9b when viewed from the second direction D2. The solder tends not to be wetted at the center of the conductor part 9b when viewed from the second direction D2, and the solder tends to be wetted in the region deviated from the center of the conductor part 9b (for example, both ends of conductor part 9b in first direction D1). Therefore, in the multilayer feedthrough capacitor 1, the bonding strength between the external electrode 9 and the electronic device 20 is secured, and the binding force that the external electrode 9 receives from the electronic device 20 via the solder fillet 22 is suppressed. When the solder is wetted at both ends of the conductor part 9b in the first direction D1, the position of the multilayer feedthrough capacitor 1 is stabilized.

In the multilayer feedthrough capacitor 1, as described above, $1.18 \leq W1/W0 \leq 5.0$ is satisfied. Therefore, when the multilayer feedthrough capacitor 1 is mounted on the electronic device 20 in a state where the principal surface 2a opposes the electronic device 20, the bonding strength between the external electrode 9 and the electronic device 20 is more surely secured, and the occurrence of the cracks in the element body 2 is further suppressed. When W1/W0 is smaller than 1.18, since the bonding strength between the conductor part 9a and the electronic device 20 is lower than when W1/W0 is equal to or more than 1.18, the mounting strength of the multilayer feedthrough capacitor 1 may decrease. When W1/W0 is larger than 5.0, since the bonding strength between the conductor part 9a and the electronic device 20 is higher than when W1/W0 is equal to or less than 5.0, the force acting on the element body 2 from an edge of the conductor part 9a is large. Therefore, the cracks may occur in the element body 2. A starting point of the crack is a portion of the element body 2 in contact with the edge of the conductor part 9a.

Although the embodiment and modification of the present invention have been described above, the present invention is not necessarily limited to the embodiment and modification, and the embodiment can be variously changed without departing from the scope of the invention.

In the above-described embodiment, each external electrode 5 includes the conductor parts 5a on the respective principal surfaces 2a. However, each external electrode 5 may include the conductor part 5a on one principal surface 2a that is the mounting surface. In the above-described embodiment, each external electrode 9 includes the conductor parts 9a on the respective principal surfaces 2a. However, each external electrode 9 may include the conductor part 9a on one principal surface 2a that is the mounting surface. In which case, the conductor parts 5a and 9a are disposed on the single principal surface 2a.

In the above-described embodiment, the multilayer feedthrough capacitor 1 includes the pair of external electrodes 9 separated from each other. However, the multilayer feedthrough capacitor 1 may include one external electrode 9 disposed on one side surface 2e. The pair of external electrodes 9 may be physically coupled on the outer surface of the element body 2. In either case, the multilayer feedthrough capacitor 1 includes at least one external electrode 9.

In the above-described embodiment, the first length N1 is 0.15 mm. However, the first length N1 is not limited to this. For example, the first length N1 may be 1 to 40% of the length of the element body 2 in the first direction D1. In which case, the bonding strength between the external electrode 5 and the electronic device 20 is secured, and the cost of raw materials of the external electrode 5 is reduced.

In the above-described embodiment, the second length N2 is 0.30 mm, and the third length N3 is 0.10 mm. However, both lengths are not limited to those. For example, the second length N2 may be 15 to 50% of the length of the element body 2 in the first direction D1, and the third length N3 may be 1 to 50% of the length of the element body 2 in the second direction D2. In which case, the bonding strength between the external electrode 9 and the electronic device 20 is secured, and the cost of raw materials of the external electrode 9 is reduced.

In the above-described embodiment, the maximum thickness T1 is 0.015 mm, and the maximum thickness T2 is 0.01 mm. However, the maximum thicknesses are not limited to those. For example, the maximum thickness T1 may be 0.01 to 0.05 mm, and the maximum thickness T2 may be 0.005 to 0.045 mm. In which case, the external electrodes 5 and 9 can be easily manufactured, and the cost of raw materials of the external electrodes 5 and 9 is reduced.

In the above-described embodiment, the shortest distance L1 is 0.09 mm. However, the shortest distance is not limited to this. The shortest distance L2 is 0.17 mm. However, the shortest distance is not limited to this. For example, the shortest distance L1 may be 0.01 to 0.095 mm, and the shortest distance L2 may be 0.01 to 0.23 mm. In which case, the bonding strength between the external electrode 5 and the electronic device 20 is appropriately adjusted.

In the above-described embodiment, the shortest distance L3 is 0.09 mm. However, the shortest distance is not limited to this. The shortest distance L4 is 0.08 mm. However, the shortest distance is not limited to this. The shortest distance L3 may be 0.01 to 0.095 mm, and the shortest distance L4 may be 0.01 to 0.14 mm. In which case, for example, the bonding strength between the external electrode 9 and the electronic device 20 is appropriately adjusted.

In the above-described embodiment, the maximum thickness M1 is 0.03 mm, and the minimum thickness M2 is 0.02 mm. However, the maximum and minimum thicknesses are not limited to those. The maximum thickness M3 is 0.02 mm, and the minimum thickness M4 is 0.015 mm. However, the maximum and minimum thicknesses are not limited to those. The maximum thickness M1 may be 0.01 to 0.1 mm, and the minimum thickness M2 may be 0.005 to 0.095 mm. The maximum thickness M3 may be 0.01 to 0.1 mm, and the minimum thickness M4 may be 0.005 to 0.095 mm. In which case, the external electrodes 5 and 9 can be easily manufactured, and the cost of raw materials of the external electrodes 5 and 9 is reduced. The depth of the depressions 6 and 10 may be 0.001 to 0.095 mm. In which case, the effect of suppressing wetting of the solder is secured, and the cost of raw materials of the external electrodes 5 and 9 is reduced.

In the above-described embodiment, the porosity of each of the conductor parts 5a and 5c (electrode layer 23) is 1.5%, the porosity of the conductor part 5b (electrode layer 23) is 2.5%, the porosity of the conductor part 9a (electrode layer 23) is 0.5%, and the porosity of the conductor part 9b (electrode layer 23) is 1.0%. However, the porosity of each conductor part is not limited those. For example, the porosity of each of the conductor parts 5a and 5c (electrode layer 23) may be 0.1 to 9.5%, the porosity of the conductor part 5b (electrode layer 23) may be 0.2 to 10%, the porosity of the conductor part 9a (electrode layer 23) may be 0.1 to 9.5%, and the porosity of the conductor part 9b (electrode layer 23) may be 0.2 to 10%. If the porosity of the conductor part 5b is larger than 10%, plating on the conductor part 5b may be reduced. If the porosity of the conductor part 9b is larger than 10%, plating on the conductor part 9b may be reduced.

A ratio between the porosity of the conductor part 5a and the porosity of the conductor part 5b may be equal to or more than 1.1. In which case, the crack tends to occur at the boundary between the conductor parts 5a and 5b. A ratio between the porosity of the conductor part 9a and the porosity of the conductor part 9b may be equal to or more than 1.1. In which case, the crack tends to occur at the boundary between the conductor parts 9a and 9b.

In the above-described embodiment and modifications, the multilayer feedthrough capacitor 1 has been described as an example of an electronic component. However, the scope of application of the present invention is not limited to the multilayer feedthrough capacitor. The present invention can also be applied to multilayer electronic components such as a multilayer capacitor, a multilayer inductor, a multilayer varistor, a multilayer piezoelectric actuator, a multilayer thermistor, and a multilayer composite component, or electronic components other than the multilayer electronic components.

What is claimed is:

1. An electronic component comprising:
an element body of a rectangular parallelepiped shape including first and second end surfaces opposing each other in a first direction, first and second side surfaces opposing each other in a second direction, and first and second principal surfaces opposing each other in a third direction, a length of the element body in the third direction being shorter than a length of the element body in the first direction and shorter than a length of the element body in the second direction; and
a pair of first external electrodes disposed at both ends of the element body in the first direction, each of the first external electrodes including:
a plating layer; and
a sintered metal layer on which the plating layer is disposed, the sintered metal layer being disposed on the element body and including:
a first conductor part disposed on one of the principal surfaces; and
a second conductor part disposed on one of the end surfaces and coupled to the first conductor part, the second conductor part being in contact with the one end surface and the plating layer, and a porosity of the first conductor part being smaller than a porosity of the second conductor part.

2. The electronic component according to claim 1, further comprising:
at least one second external electrode disposed on the element body and positioned between the pair of first external electrodes, the second external electrode including:
a second plating layer; and
a second sintered metal layer on which the second plating layer is disposed, the second sintered metal layer being disposed on the element body and including a third conductor part disposed on one of the side surfaces, the third conductor part being in contact with the one side surface and the second plating layer, and a porosity of the third conductor part being smaller than the porosity of the second conductor part.

3. The electronic component according to claim 1, further comprising:
at least one second external electrode disposed on the element body and positioned between the pair of first external electrodes, the second external electrode including:
a second plating layer; and
a second sintered metal layer on which the second plating layer is disposed, the second sintered metal layer being disposed on the element body and including a fourth conductor part disposed on the one principal surface, the fourth conductor part being in contact with the one principal surface and the second plating layer, and a maximum thickness of the fourth conductor part being smaller than a maximum thickness of the first conductor part.

4. The electronic component according to claim 3, wherein the second sintered metal layer further includes a fifth conductor part disposed on one of the side surfaces, the fifth conductor part is in contact with the one side surface and the second plating layer, and a porosity of the fifth conductor part is smaller than the porosity of the second conductor part.

\* \* \* \* \*